(12) United States Patent
Jain

(10) Patent No.: US 9,442,623 B2
(45) Date of Patent: Sep. 13, 2016

(54) GUIDE LINE SNAPPING

(75) Inventor: Gaurav Jain, Vidisha (IN)

(73) Assignee: Adobe Systems Incorporated, San Jose, CA (US)

(*) Notice: Subject to any disclaimer, the term of this patent is extended or adjusted under 35 U.S.C. 154(b) by 1952 days.

(21) Appl. No.: 12/142,591

(22) Filed: Jun. 19, 2008

(65) Prior Publication Data

US 2014/0033132 A1    Jan. 30, 2014

(51) Int. Cl.
G06F 3/048    (2013.01)
G06F 3/0481    (2013.01)

(52) U.S. Cl.
CPC ................ G06F 3/04812 (2013.01)

(58) Field of Classification Search
CPC .................................. G06F 3/04812
USPC ........ 715/762–763, 788, 856–857, 862, 964; 345/157, 443, 651, 662, 677, 652
See application file for complete search history.

(56) References Cited

U.S. PATENT DOCUMENTS

| | | | | |
|---|---|---|---|---|
| 5,299,307 A * | 3/1994 | Young | ........................... | 715/861 |
| 5,327,528 A * | 7/1994 | Hidaka et al. | ................ | 715/858 |
| 5,757,358 A * | 5/1998 | Osga | ............................ | 715/862 |
| 5,793,377 A * | 8/1998 | Moore | ......................... | 345/619 |
| 5,818,415 A * | 10/1998 | Shirakawa | .................... | 345/442 |
| 6,065,021 A * | 5/2000 | George | ......................... | 715/245 |
| 6,480,813 B1 * | 11/2002 | Bloomquist et al. | ............. | 703/1 |
| 6,911,981 B2 * | 6/2005 | Thoemmes et al. | .......... | 345/443 |
| 6,919,887 B2 * | 7/2005 | Vazzana | ........................ | 345/419 |
| 7,093,192 B2 * | 8/2006 | Mullen et al. | ................ | 715/202 |
| 7,098,933 B1 * | 8/2006 | Thoemmes et al. | .......... | 345/677 |
| 8,120,604 B2 * | 2/2012 | Kinoshita et al. | ............. | 345/419 |
| 2003/0206169 A1 | 11/2003 | Springer et al. | | |
| 2005/0168459 A1 * | 8/2005 | Baird | ............................ | 345/419 |
| 2006/0174568 A1 | 8/2006 | Kinoshita et al. | | |

OTHER PUBLICATIONS

Sedgewick, Robert, Algorithms, 2nd edition, Addison-Wesley, ISBN 0-201-06673-4, copyright 1988, Chapter 26, Range Searching, pp. 373-386.*

* cited by examiner

*Primary Examiner* — Doon Chow
*Assistant Examiner* — Wilson Varga
(74) *Attorney, Agent, or Firm* — Shook, Hardy & Bacon L.L.P.

(57) ABSTRACT

Apparatus, systems, and methods may operate to determine a substantially perpendicular current distance from a cursor guide line that passes through a given current cursor location, to a reference point. Additional activity may include determining candidate guide lines that comprise a subset of a larger group of guide lines and that are associated with at least one drawing object, each one of the subset having a substantially perpendicular reference distance to the reference point that is within a range defined by a snapping tolerance and the current distance. A snapping location can be displayed on the closest one of the subset as measured from the current cursor location. Additional apparatus, systems, and methods are disclosed.

20 Claims, 6 Drawing Sheets

```
Point refPoint(0,0);          /-210                              /-200
                              /-220
multi-map<float, Line> listOfLines;
                                              /-230
void CollectLinesData(Vector<Point> listOfPoints)
{
for each (point 'Pt' in listOfPoints)
        {                           /-232
        ln = new Line(Pt, fixedAngleInDegree);   /-234
        dRef = ln->Distance(refPoint);  ----------/-236
        aMap.insert(pair<float, Line>(dRef, *ln));
        }
}
                         /- 240
void Snap (Point currentLocation)
        {
                                                      /-242
        line = new Line (currentLocation, fixedAngleInDegree);
                                        /-244
        dRefP = line->Distance(refPoint);

// lower_bound is a standard function available on many STL Containers in C++
        // it returns index of the first item in multi-map for which the 'key' is >= supplied
        // parameter value. It runs in Logarithmic time complexity.
                                                                      /-248
        A ==> startIterator = aMap.lower_bound(dRefP - snappingTolerance);

// upper_bound is a standard function available on many STL Containers in C++
        // it returns index of the first item in multi-map for which the 'key' is > supplied
        // parameter value. It runs in Logarithmic time complexity.
                                                           /-252
        endIterator = aMap.upper_bound(dRefP + snappingTolerance);

// The data which is processed is limited by this range i.e. only the
        // lines which are in tolerance range either side are considered
        // for snapping. Other lines are simply discarded by binary search performed
        // by lower_bound and upper_bound on the distance value.

B ==> multi-map<float, Line>::iterator location =        /- 256
                SelectBestCandidateToSnap( aMap, startIterator, endIterator);
        // location points to the Line object where snapping should be done.
                                                   /-260
        SnapToLine(currentLocation, candidateLines[location]);
        }
                                                                        /-270
multi-map<float, Line>::iterator
SelectBestCandidateToSnap(Multi-map &, Multi-map::iterator& start, Multi-map::iterator& end)
{

// If there are more than one candidate in the list for snapping then choose
// the one closest to current location
}
```

FIG. 2

GUIDE LINE SNAPPING

LIMITED COPYRIGHT WAIVER

A portion of the disclosure of this patent document contains material which is subject to copyright protection. The copyright owner has no objection to the facsimile reproduction by anyone of this patent disclosure, as it appears in the Patent and Trademark Office patent records, but otherwise reserves all copyright rights whatsoever. Copyright 2008 Adobe Systems Incorporated.

BACKGROUND

Cursor snapping is a mechanism used in some computer-assisted drawing applications to assist in aligning a user-guided cursor with selected points in a drawing, such as drawing coordinate grid points that coincide with the outlines of various drawing objects. Whether or not the cursor snaps to a particular location is typically determined by a pre-selected tolerance value. Thus, when the cursor comes within a certain distance of a candidate snapping point location, and the distance is less than the snapping tolerance, the cursor is automatically moved from its current location to the snapped location.

Since coordinate grid points may not form a set of convenient snapping locations, some drawing applications operate to snap the cursor location to certain imaginary guide lines. These guide lines are generated at a specified angle with respect to the drawing coordinate system, and intersect selected points in the drawing (e.g., the corners of drawings objects). Thus, when the cursor comes within a certain distance that is less than the snapping tolerance from one of these guide lines, the cursor is snapped to the guide line and the guide line is then displayed in the drawing to give visual feedback to the user.

To process all of the potential guide lines that are within the snapping tolerance of the current cursor location, a clipping rectangle is formed that bounds space around the cursor. All guide lines that pass through all drawing objects are clipped with the clipping rectangle. An immense processing workload due to clipping activity may thus arise, because even those lines that are clearly not within the proximity of the current cursor location may be clipped against the clipping rectangle before being processed and discarded as a guide line that might include a potential snapped location.

The problem may be more easily recognized when a concrete example is considered. Assume that a drawing includes N objects, with each object generating M potential guide lines. As the cursor is moved across the drawing, the drawing application operates to clip M*N lines before determining the next snapped location. Thus, if there are 1000 objects in a drawing, and each object has only three potential guide lines, 3000 lines are clipped against the clipping rectangle as the cursor is moved from point to point. Since snapping is an operation that may be performed every time the user moves the drawing cursor to a new location, the drawing application in this case clips 3000 lines before a decision can be made as to whether to move the cursor to a new snapping location, and if so, to which snapping location. This processing workload exists even when most, or all of the potential guide lines are nowhere near the current cursor location, resulting in a reduced cursor tracking rate and guide line display speed.

BRIEF DESCRIPTION OF DRAWINGS

Some embodiments are illustrated by way of example, and not limitation, in the figures of the accompanying drawings, in which:

FIG. 2 is a listing of pseudo code to accomplish guide line snapping according to an example embodiment.

DETAILED DESCRIPTION

Figure 1:
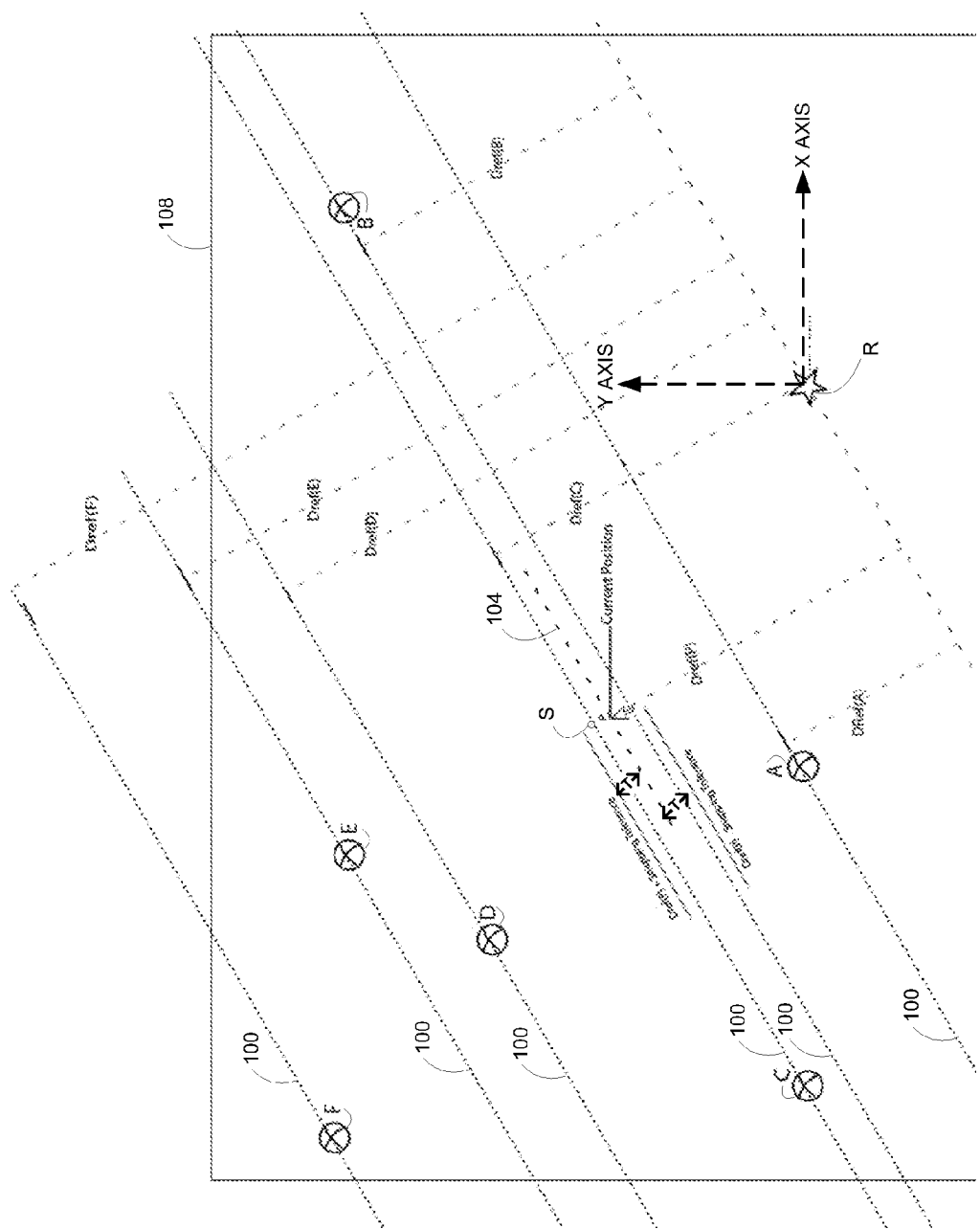
FIG. 1 illustrates a group of guide lines proximate to a current cursor location bounded by a snapping tolerance, with the snapping point established according to various embodiments.

To solve the performance problems noted above, among others, it is useful to note that guide line snapping can be accomplished by focusing on the location of guide lines, rather than the object points that generate them. In some embodiments, then, a cursor line object may be created that intersects the current cursor position. The perpendicular reference distance from the cursor line object to a reference point (e.g., the origin of the coordinate system) is calculated, along with similar distances from each of the drawing guide lines. Each of the reference distances is saved in memory. By using an efficiently bounded search to explore the memory, those guide lines that fall within the snapping tolerance of the cursor location can be located and designated as candidates for the new snapping location. The guide line closest to the current location can be determined by finding the guide lines that provides a minimum difference between the cursor guide line reference distance, and the reference distance for that guide line.

For the purposes of this document, the term "guide line" refers to a temporary line that can be observed along with actual drawing lines, oriented at a pre-selected angle to the coordinate system in use, and used as a reference with respect to potential intersection with drawing objects in the field of view. A guide line may be indicated as a temporary dashed line passing through the current cursor location, for example. Guide lines are drawn as annotations when desired, such as when a guide line coincides with a snapping location. For example, in some embodiments, once the cursor is snapped to the guide line, then the guide line is displayed; otherwise, it is not displayed. Guide lines may be displayed at other times in other embodiments. Guide lines serve as imaginary lines similar to or identical to Smart Guides, as they are sometimes known in the industry. For example, Smart Guides are employed by the ADOBE® Illustrator® vector drawing program, among others.

The term "electronic content" includes any digital data that may be presented to a user (e.g., visually or audibly presented), such as an electronic document, a drawing file, a media stream, a web page, a hypertext document, an image, digital video or a video recording, digital audio or an audio recording, animation, a markup language document, such as a HyperText Mmarkup Language (HTML) or eXtensible Markup Language (XML) document, a form having blank components to accept entered data, or data describing the application of a graphical user interface (GUI).

Any document or drawing file may be organized according to a page descriptive format, which includes a portable document format, where "portable document format" means a device-independent and display resolution-independent fixed-layout document format, including the text and fonts, images, and graphic paths associated with the document. The format may comprise a representation of a two-dimensional document, or a three-dimensional document. An example of a commercially available portable document format (PDF) is the format described in "PDF Reference", sixth edition, ADOBE® Portable Document Format, Version 1.7, November 2006.

A "content element" includes any part of electronic content that is defined or discernable as a part. For example, a content element may be automatically discerned from a characteristic of the content element itself (e.g., a paragraph of an electronic document, or a file format designation) or may be manually defined by a user (e.g., a user-selected collection of words in an electronic document, a user-selected portion of a digital image). Examples of content elements include portions of a page-descriptive document or other electronic document, such as pieces of electronic text, drawing objects, guide lines, and other material within an electronic document, dynamic content in the form of portions of media streams, such as sections of digital video or frames or sets of frames of digital video or digital audio, dynamic content in the form of segments or frames of animations, electronic forms, form templates, form elements, form data, actuatable element specifications or executable instructions, and various elements presentable or accessible by users within electronic content, including instances of scripted and non-scripted dynamic content and the like.

The term "rendering" used as a verb includes presenting or making accessible electronic content or content elements to be perceived, viewed, or otherwise experienced by a user, or made available for further processing, such as, for example, searching, digesting, printing, analyzing, distilling, or transforming by computational processes that may not include processing the intrinsic data structure describing the electronic content or content element.

The term "rendering" used as a noun includes human-perceivable representations of data that is within a machine and perception-specialized organizations of data defining such representations. For example, a rendering may include a pattern of human-perceivable matter or energy presented on an output device (e.g., a display) by a machine, as well as the organization of data within a machine that defines such patterns. For example, such organizations of data may include the electronic configuration of a memory used by a graphics display processor, a file containing drawing objects from which a rendering of a drawing can be made, or a file containing an audio segment suitable for playing via an audio system of a computer.

The term "rendering module" may be taken to include systems, applications, and mechanisms for rendering or presenting electronic content to a user, including the presentation of content elements such as text, graphics, form element renderings and other electronic content elements. An example of a rendering module includes a web browser component (e.g., Microsoft Internet Explorer) or other component to render electronic content such as HTML pages. Other examples of rendering modules include the ADOBE® Acrobat® electronic publishing program, and the ADOBE® Illustrator® drawing program.

The term "rendering program" includes applications for rendering or presenting dynamic content to a user. An example of a rendering program is the ADOBE® FLASH® Player 9 runtime software application. In many embodiments, a rendering module interacts with a rendering program to render dynamic content.

Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). Modules may include hardware circuitry, optical components, single or multi-processor circuits, memory circuits, software program modules and objects, firmware, and combinations thereof, as appropriate for particular implementations of various embodiments. The term "module" includes an identifiable portion of code, data, or a computational object to achieve a particular function, operation, processing, or procedure.

FIG. 1 illustrates a group of guide lines 100 proximate to a current cursor location P bounded by a snapping tolerance ±T, with the snapping point S established according to various embodiments. In the figure, points A, B, C, D, E and F are drawing object corner points shown on a display viewport 108. Guide lines 100 are generated so as to include the points A-F at an angle of 30 degrees (with respect to the X-Y coordinate system having its origin at the reference point R). The angle of 30 degrees used for guide line 100 generation is used in this figure by way of illustration, and not limitation—other angles may be used. The dotted guide lines 100 are imaginary lines, and not actually part of the drawing.

To determine a new snapped location S all of the guide lines 100 within the snapping tolerance T of current cursor location P are designated as candidates, with the closest of the candidates to the location P taken to include the new snapping location S. The current cursor location P may be obtained from a user input device, a data file, etc.

To determine the subset of all guide lines which are within the snapping tolerance T of the current cursor location P, the perpendicular reference distance between each guide line generated by the points A-F and the reference point R are calculated and stored, perhaps in a sorted multi-map data structure, as distances Dref(A), Dref(B), Dref(C), Dref(D), Dref(E), and Dref(F), respectively. The reference distance Dref(P) from the cursor guide line 104 and the reference point R is likewise calculated and stored. The application software may then operate to determine, perhaps utilizing a binary search of the data structure, that only reference distances Dref(B) and Dref(C) lie within the boundary established by the tolerance T. By implementing this mechanism, the lines 100 represented by points A and D-F are not processed with respect to determining the line 100 that passes most closely to the current cursor location P. Finally, by calculating the distance from both Dref(B) and Dref(C) to the current cursor location P (based on the distance Dref(P)), it can be determined that the guide line defining Dref(C) is the guide line that includes the new snapping point S.

The conventional approach of clipping all guide lines in a drawing is time consuming and wastes system resources. The approach outlined herein can serve to dramatically reduce the number of guide lines that are processed as the cursor moves across a drawing. In this particular case, instead of clipping all guide lines 100 prior to processing them as candidates for snapping, only the guide lines 100 generated by points B and C are processed.

In some embodiments, the guide lines 100 may be generated at angles of either zero or ninety degrees (e.g., parallel to one of the X or Y axes), so that one of either the X or Y coordinates of points along these guide lines can be used directly as the reference distance Dref, further reducing the amount of processing employed when calculating the perpendicular distance from the reference point R to each guide line 100.

The data structure that includes information about each of the guide lines may be formatted to include (a) the coordinates of the point that generates the guide line, (b) the angle of the guide line, (c) the reference distance. Thus, instead of a simple vector of line objects, the data structure might be formed as a multi-map of line objects, where each line object includes a floating point representation of the reference distance. The multi-map information can be stored in an ordered fashion, perhaps sorted according to the reference distance values.

For example, "Line" might comprise the class that holds information about each guide line, such as the point through which the guide line passes, the angle at which it is to be generated, and the reference distance. The multi-map key for the group of guide lines may then comprise the perpendicular reference distance associated with each "Line" object represented.

The subset of candidate lines to be considered for snapping is usually reduced using the apparatus, systems, and methods described herein, since the binary search is bounded by the tolerance T, so that the search is applied only to the guide lines (e.g., generated by points B and C) which are actually in proximity to the current cursor location P. The lines that are not in proximity (e.g., generated by points A and D-F) would simply be discarded by the binary search.

FIG. 2 is a listing 200 of pseudo code to accomplish guide line snapping according to an example embodiment. The code and data structures used in this figure are set forth as a mechanism that can be used to explain the concepts described herein, and have not been compiled. However, the convention used is similar to a variety of C and C++ programming language constructs.

At 210, a reference point is set as the origin (0,0) of the coordinate system. At 220, a multi-map data structure including the list of all guide lines is established.

At 230, the data structure is filled with information for each of the guide lines. For example, at 232, a new guide line can be created for each desired point in the drawing (e.g., each drawing object corner point). At 234, the perpendicular reference distance for each guide line is calculated. At 236, the information regarding the line and the reference distance are inserted into the multi-map data structure.

At 240, the function is defined that results in snapping the cursor to the snapped location from the current location. For example, at 242, the cursor guide line is generated, and at 244, the perpendicular reference distance between the cursor guide line and the reference point is calculated.

At this point, the range of reference distance values to be associated with a subset of candidate guide lines, using lower and upper values to bound searching the multi-map, can be established. Thus, at 248, the lower bound is established as the location in the multi-map where searching can begin: where the guide line reference distance is greater than the cursor reference distance minus the snapping tolerance. At 252, the upper bound is established as the location in the multi-map where searching can end: where the guide line reference distance is greater than the cursor reference distance plus the snapping tolerance. Searching to locate the bounded subset of guide lines, including binary searching, can be accomplished at both 248 and 252.

At 256, the set of guide lines that are within the snapping tolerance of the current cursor location can be obtained, as defined by the variables startIterator and endIterator in aMap. If there is more than one guide line that results from the binary search, the guide line that is closest to the current cursor location can be determined at 270 by finding the minimum value of Dref(P)−Dref (for that line) from the subset of candidate lines produced by the searching. The current location of the cursor can then be snapped to the closest candidate line at 260. Thus many embodiments may be realized.

Figure 3:
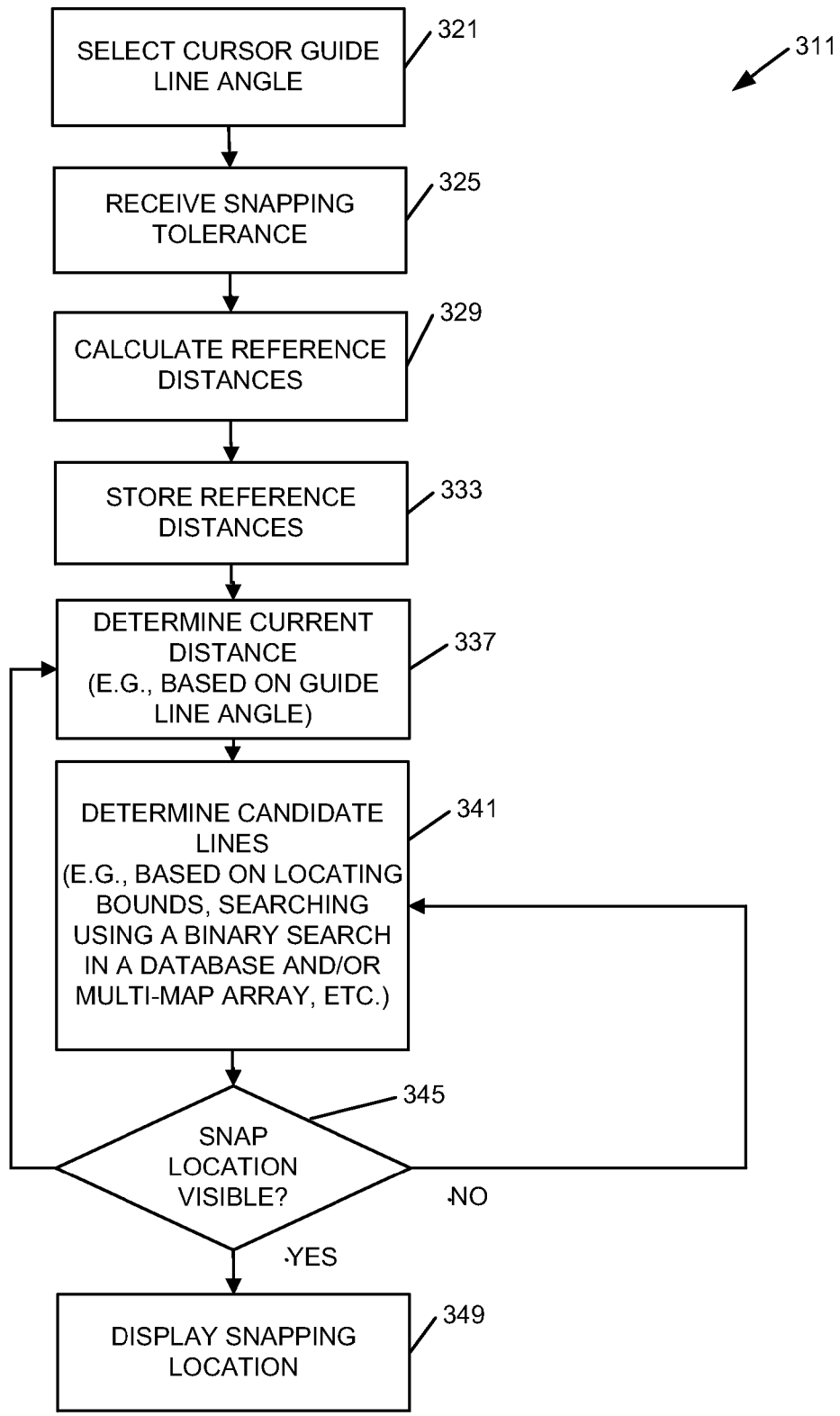
FIG. 3 is a flow diagram illustrating several methods according to various embodiments.

For example, FIG. 3 is a flow diagram illustrating several methods 311 according to various embodiments. In some embodiments, a method 311 to implement guide line snapping may begin at block 321 with selecting an angle for the cursor guide line as any angle with respect to a defined coordinate system, including one of zero degrees or ninety degrees. If the latter is chosen, processing may be further reduced, since the reference distance now comprises a distance that can be measured directly along the X-axis or Y-axis. The method 311 may continue on to block 325 with receiving the snapping tolerance, perhaps as a user entry from a GUI. Other ways of setting the snapping tolerance may also be implemented, including by extracting the tolerance from a default drawing application settings file.

The method 311 may continue on to block 329 with calculating the reference distance for a larger group of guide lines (e.g., all of the guide lines that are displayed in the current drawing view port). The method 311 may go on to include, at block 333, inserting the reference distance for each of the larger group of guide lines into a table, perhaps by setting up a multi-map to include the reference distance for each guide line in a drawing. Thus, the activity at block 333 may include storing the reference distances in an array sorted according to the reference distance values.

The method 311 may include, at block 337, determining a substantially perpendicular current distance (e.g., Dref(P)) from a cursor guide line that passes through a given current cursor location, to a reference point. The activities at block 337 may include receiving an angle associated with the cursor guide line that includes the current cursor location (e.g., the guide line angle established in block 321). As noted previously, the angle may be referenced to an axis of an X-Y coordinate system that has the reference point as its origin.

In most embodiments, the method 311 includes going on to block 341 with determining candidate guide lines that comprise a subset of the larger group of guide lines. Each of the candidate guide lines may be associated with at least one drawing object, and each one of the subset has a substantially perpendicular reference distance (e.g., Dref (for that line)) to the reference point that is within the range defined by the snapping tolerance and the current cursor location reference distance (e.g., Dref(P)).

The activity of determining the candidate guide lines that comprise the subset at block 341 may comprise searching, using a binary search, in a database that includes the reference distance for each of the larger group of guide lines. This activity may include, in addition, or alternatively, searching in a multi-map array that includes the reference distance for each of the larger group of guide lines, sorted according to the reference distance. As noted previously, to bound the search, the activity at block 341 may include locating an upper bound and a lower bound in an array that includes information associated with each of the subset of candidate guide lines, wherein the upper bound and the lower bound are based on the range established by the tolerance about the current cursor location.

If the snapping location is determined to be invisible at block 345 (e.g., outside the current view port), then the method 311 may include returning to block 341, with determining the existence of additional candidate guide lines as the cursor moves across the drawing. However, if the snapping location is determined to be visible at block 345, then the method 311 may go on to block 349 with displaying the snapping location on the closest one of the subset as measured from the current cursor location. Many other embodiments may be realized.

Figure 4:
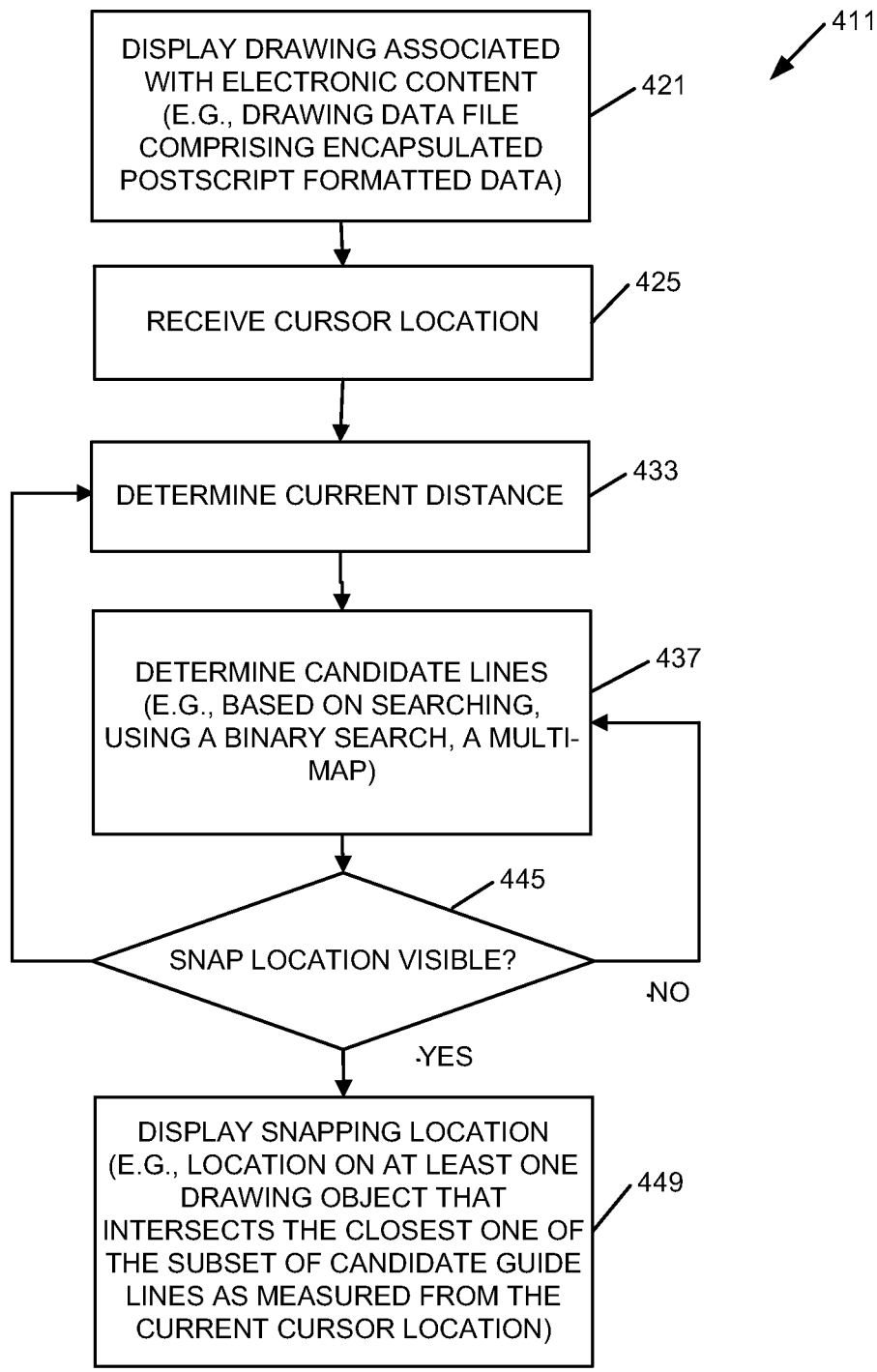
FIG. 4 is a flow diagram illustrating several additional methods according to various embodiments.

For example, FIG. 4 is a flow diagram 411 illustrating several additional methods according to various embodiments. For example, a method 411 to implement guide line snapping may begin at block 421 with displaying a drawing in conjunction with a GUI on a display, the drawing associated with electronic content in the form of a drawing data file. A portion of the drawing data file may comprise encapsulated postscript formatted data.

The method 411 may go to include, at block 425, receiving a current cursor location from a user input device. The user input device may comprise a mouse, a trackball, a keyboard, a touch screen or touch pad, and/or a voice recognizer, among others. The method 411 may go on to block 433 to include determining a substantially perpendicular current distance from a cursor guide line that passes through a given current cursor location, to a reference point. In some embodiments, the activity at block 433 may include displaying the cursor guide line as a broken line, such as a dashed line, a dotted line, or combinations of these.

The method 411 may include determining candidate guide lines that comprise a subset of a larger group of guide lines and that are associated with at least one drawing object included in the drawing at block 437. Each one of the subset may be associated with a substantially perpendicular reference distance to the reference point that is within the range defined by a snapping tolerance and the current distance from the cursor guide line to the reference point.

The activity of determining candidate guide lines that comprise the subset at block 437 may include searching, using a binary search, a multi-map that includes the reference distance for each of the larger group of guide lines, perhaps sorted according to the reference distance. In this way, binary searching can be used to search a sorted multi-map to determine the subset of candidates within the snapping tolerance range, instead of the entire set of guide lines for the drawing.

If the snapping location is determined not to be visible at block 445 (e.g., outside the current view port), then the method 411 may include returning to block 437, with determining the existence of additional candidate guide lines as the cursor moves across the drawing. However, if the snapping location is determined to be visible at block 445, then the method 411 may go on to block 449 with displaying a snapping location on at least one drawing object that intersects the closest one of the subset of candidate guide lines as measured from the current cursor location. In some embodiments, the current distance and the reference distance are each measured along an axis (e.g., X axis or Y axis) in a coordinate system having the reference point as its origin.

The activity at block 449 may include displaying the snapping location and the closest one of the subset of candidate lines, which may in turn be displayed as a dashed, dotted, or combination dashed-dotted line. In addition, the method 411 may include, at block 449, displaying the snapping location by displaying a line segment on the closest one of the subset of guide lines, where the line segment is defined by the current cursor location and the snapping location.

It should be noted that the methods described herein do not have to be executed in the order described, or in any particular order. Moreover, various activities described with respect to the methods identified herein can be executed in iterative, repetitive, serial, or parallel fashion. Activities within various methods may also be combined, to include combination across the various figures used herein. Information, including parameters, commands, operands, and other data, can be sent and received in the form of one or more carrier waves.

Figure 5:
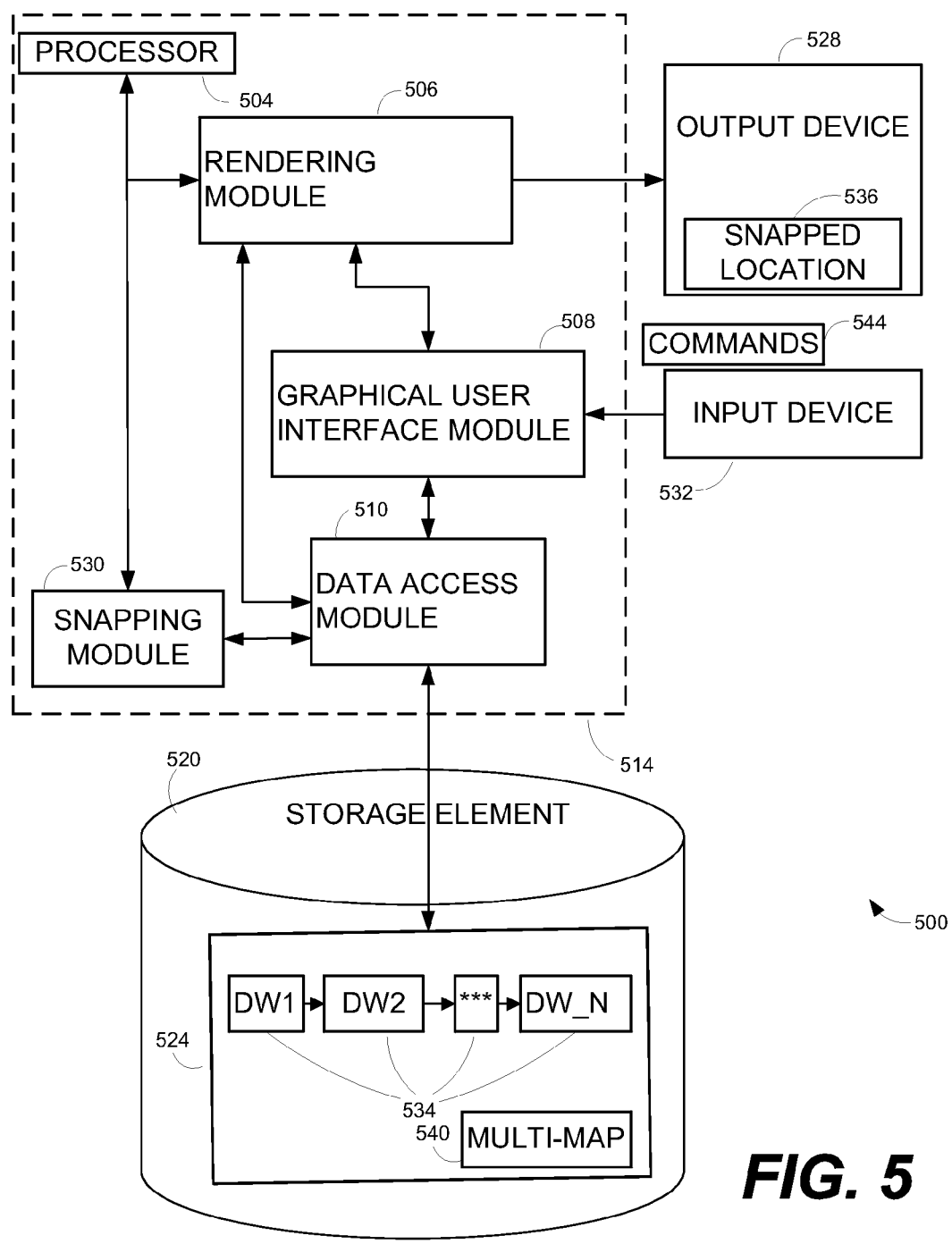
FIG. 5 is a block diagram of apparatus and systems according to various embodiments.

FIG. 5 is a block diagram of a system 500 according to various embodiments. The system 500 may include a number of modules such as one or more processors 504, a rendering module 506, a GUI module 508 and a data access module 510. The rendering module 506 and the GUI module 508 may take the form of an integral module, or exist a separate modules, as shown. A snapping module 530 may also be included. These modules may be associated within a machine 514, such as a personal digital assistant (PDA), laptop, personal computer, workstation, or server, as indicated by their containment within the dashed box.

In order to avoid obscuring the components of FIG. 5, connecting lines between each of the elements within the machine 514 have not been shown. However, those of ordinary skill in the art will understand that any of the individual elements shown to be located within the confines of the machine 514 may be operably coupled to any other element within the machine 514. Similarly, those of ordinary skill in the art will understand that any of the components shown to be located within the confines of the machine 514 may also be located outside the machine 514, and appropriately coupled to the machine 514 via wired or wireless networks or other interface mechanisms.

The data access module 510 may be used by the rendering module 506 to access a storage element 520, such as a database, a memory, a disk, or other storage device. The storage element 520 may serve to contain one or more items of electronic content 524, such as electronic documents 534, including drawing documents DW1, DW2, . . . , DW_N. The data access module 510 may operate to read from and/or write to the electronic content 524 and may provide reading and writing services for the benefit of other system modules, including the GUI 508, the rendering module 506, the processor 504, and the snapping module 530. The electronic content 524 may include one or more content elements 534, such as various versions of a document. The storage element 520 may also be used to contain a data structure 540, such as a sorted multi-map of information with respect to each guide line in a drawing file (e.g., drawing file DW1).

The data access module 510 may be present in some embodiments, and absent in others. When present, the data access module 510 may operate as a mediator between the various components of the system 500 and the electronic content 524. For example, the storage element 520 may be included in a remote server.

The rendering module 506 may be operably coupled to an output device 528, such as a display screen, printer, or loudspeaker, among others. This output device 528 may be used for presenting renderings of content elements 534. Rendering may take the form of displaying the content elements 534, including a drawing associated with a drawing file, and a snapped location 536 (e.g., the rendering on the output device 528 may be similar to or identical to the display content shown in the view port 108 of FIG. 1).

A GUI module 508 may be operably connected to the rendering module 506 and the data access module 510. The rendering module 506 may comprise a portable document format processing program in some embodiments.

The GUI module 508 may receive input from input devices 532 (e.g., a keyboard, a mouse, a trackball, voice recognizer, touch pad, touch screen, etc.), including user input comprising cursor movement commands 544 to be transmitted to an electronic drawing application. Thus, many embodiments may be realized.

For example, a system 500 to implement guide line snapping may comprise an output device 528 in the form of a display, and a snapping module 530 to determine a substantially perpendicular current distance from a cursor guide line that passes through a given current cursor location, to a reference point, and to determine candidate guide lines that comprise a subset of a larger group of guide lines and that are associated with at least one drawing object. Each one of the subset may have a substantially perpendicular reference distance to the reference point that is within a range defined by a snapping tolerance and the current distance, as described previously.

The system 500 may further comprise a rendering module 506 to display a snapping location on the closest one of the subset as measured from the current cursor location on the display. The system 500 may comprise a desktop computer, a laptop computer, a workstation, or a client and a server, for example. Thus, in some embodiments, the system 500 may comprise a server including the snapping module 530. In some embodiments, the system 500 includes a user input device 532 to provide the current cursor location to the snapping module 530, such as when user input provides the current cursor location directly.

Figure 6:
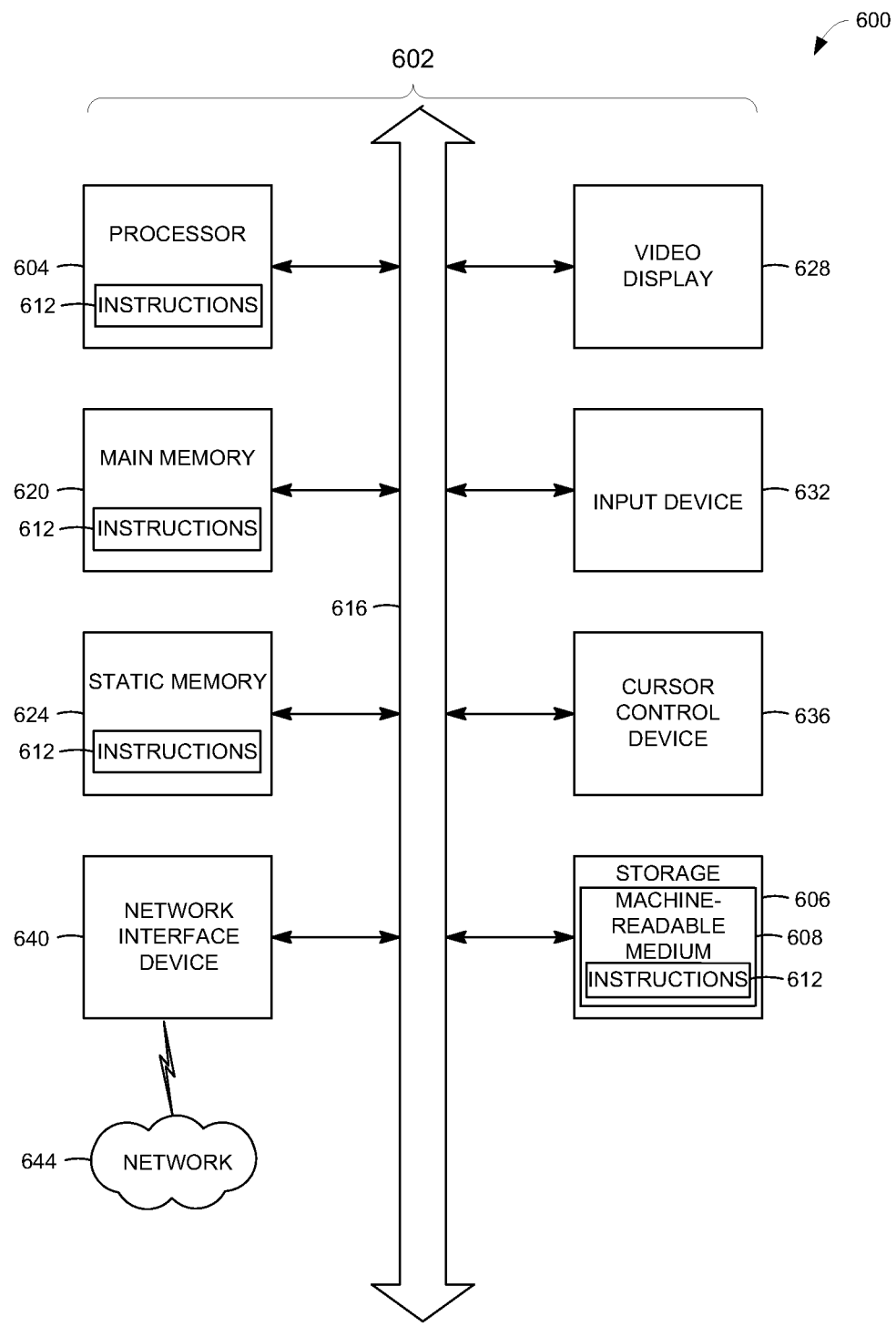
FIG. 6 is a block diagram of an article of manufacture, including a machine, according to various embodiments.

FIG. 6 is a block diagram of an article 600 of manufacture, including a machine 602, according to various embodiments. Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or inter-process communication techniques, including remote procedure calls. The teachings of various embodiments are not limited to any particular programming language or environment.

Thus, other embodiments may be realized. For example, an article 600 of manufacture, such as a computer, a memory system, a magnetic or optical disk, some other storage device, and/or any type of electronic device or system may include one or more processors 604 coupled to a machine-readable medium 608 such as a memory (e.g., removable storage media, as well as any memory including an electrical, optical, or electromagnetic conductor) having instructions 612 stored thereon (e.g., computer program instructions), which when executed by the one or more processors 604 result in the machine 602 performing any of the actions described with respect to the methods above.

Machine 602 may take the form of a computer system having a processor 604 coupled to a number of components directly, and/or using a bus 616. Thus, the machine 602 may be similar to or identical to the system 500 shown in FIG. 5.

Turning now to FIG. 6, it can be seen that the components of the machine 602 may include main memory 620, static or non-volatile memory 624, and mass storage 606. Other components coupled to the processor 604 may include an output device 628, such as a video display, an input device 632, such as a keyboard, and a cursor control device 636, such as a mouse. A network interface device 640 to couple the processor 604 and other components to a network 644 may also be coupled to the bus 616. The instructions 612 may further be transmitted or received over the network 644 via the network interface device 640 utilizing any one of a number of well-known transfer protocols (e.g., HTTP). Any of these elements coupled to the bus 616 may be absent, present singly, or present in plural numbers, depending on the specific embodiment to be realized.

The processor 604, the memories 620, 624, and the storage device 606 may each include instructions 612 which, when executed, cause the machine 602 to perform any one or more of the methods described herein. In alternative embodiments, the machine 602 operates as a standalone device or may be connected (e.g., networked) to other machines. In a networked environment, the machine 602 may operate in the capacity of a server or a client machine in server-client network environment, or as a peer machine in a peer-to-peer (or distributed) network environment. The machine 602 may be a personal computer (PC), a tablet PC, a set-top box (STB), a PDA, a cellular telephone, a web appliance, a network router, switch or bridge, or any machine capable of executing a set of instructions (sequential or otherwise) that specify actions to be taken by that machine. Further, while only a single machine 602 is illustrated, the term "machine" shall also be taken to include any collection of machines that individually or jointly execute a set (or multiple sets) of instructions to perform any one or more of the methodologies discussed herein.

While the machine-readable medium 608 is shown as a single medium, the term "machine-readable medium" should be taken to include a single medium or multiple media (e.g., a centralized or distributed database, and/or associated caches and servers, and or a variety of storage media, such as the processor 604 registers, memories 620, 624, and the storage device 606) that store the one or more sets of instructions 612. The term "machine-readable medium" shall also be taken to include any medium that is capable of storing, encoding or carrying a set of instructions for execution by the machine and that cause the machine 602 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Implementing the apparatus, systems, and methods of the various embodiments may provide a faster way to select a group of candidate guide lines proximate to a cursor location, out of a larger universe or multiplicity of guide lines in a drawing. The number of lines searched to determine the set of candidate lines may be dramatically reduced over the number provided with more conventional methods. Improved cursor tracking and guide line drawing performance may result.

Although embodiments of the invention have been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those of ordinary skill in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Embodiments may, for example, be implemented as a stand-alone application (e.g., without any network capabilities), a client-server application or a peer-to-peer (or distributed) application. Embodiments may also, for example, be deployed by Software-as-a-Service (SaaS), Application Service Provider (ASP), or utility computing providers, in addition to being sold or licensed via traditional channels.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of ordinary skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A computer implemented method, comprising:
  determining a substantially perpendicular current distance from a cursor guide line that passes through a given current cursor location, to a reference point;
  determining candidate guide lines that comprise a subset of a larger group of guide lines and that are associated with at least one drawing object, each one of the subset having a substantially perpendicular reference distance to the reference point that is within a range defined by a snapping tolerance and the current distance; and
  displaying a snapping location on a closest one of the subset as measured from the current cursor location including displaying the snapping location separately from a display of the current cursor location.

2. The method of claim 1, wherein determining the substantially perpendicular current distance comprises:
  receiving an angle associated with the cursor guide line that includes the current cursor location.

3. The method of claim 2, wherein the angle is referenced to an axis of an x-y coordinate system having the reference point as an origin.

4. The method of claim 1, wherein determining the candidate guide lines that comprise the subset comprises:
  searching, using a binary search, in a database that includes the reference distance for each of the larger group of guide lines.

5. The method of claim 1, wherein determining the candidate guide lines that comprise the subset comprises:
  searching in a multi-map array that includes the reference distance for each of the larger group of guide lines, sorted according to the reference distance.

6. The method of claim 1, wherein determining the candidate guide lines that comprise the subset comprises:
  locating an upper bound and a lower bound in an array that includes information associated with each of the subset of candidate guide lines, wherein the upper bound and the lower bound are based on the range.

7. The method of claim 1, comprising:
  calculating the reference distance for the larger group of guide lines; and
  inserting the reference distance for each of the larger group of guide lines into a table.

8. The method of claim 1, comprising:
  selecting an angle for the cursor guide line as one of zero degrees or ninety degrees, such that the reference distance comprises a distance measured along one of an x-axis or a y-axis.

9. The method of claim 1, comprising:
  receiving the snapping tolerance from a graphical user interface.

10. A computer implemented method, comprising:
  displaying a drawing in conjunction with a graphical user interface on a display, the drawing associated with a drawing data file;
  receiving a current cursor location from a user input device;
  determining a substantially perpendicular current distance from a cursor guide line that passes through a given current cursor location, to a reference point;
  determining candidate guide lines that comprise a subset of a larger group of guide lines and that are associated with at least one drawing object included in the drawing, each one of the subset having a substantially perpendicular reference distance to the reference point that is within a range defined by a snapping tolerance and the current distance; and
  displaying a snapping location on the at least one drawing object that intersects a closest one of the subset as measured from the current cursor location including displaying the snapping location separately from a display of the current cursor location, wherein the current distance and the reference distance are each measured along an axis in a coordinate system having the reference point as an origin.

11. The method of claim 10, comprising:
displaying the cursor guide line as a broken line.

12. The method of claim 10, wherein the drawing data file comprises data in an encapsulated postscript format.

13. The method of claim 10, wherein determining candidate guide lines that comprise the subset comprises:
searching, using a binary search, a multi-map that includes the reference distance for each of the larger group of guide lines, sorted according to the reference distance.

14. The method of claim 10, comprising:
displaying the snapping location and the closest one of the subset.

15. A system, comprising:
a display;
a snapping module to determine a substantially perpendicular current distance from a cursor guide line that passes through a given current cursor location, to a reference point, and to determine candidate guide lines that comprise a subset of a larger group of guide lines and that are associated with at least one drawing object, each one of the subset having a substantially perpendicular reference distance to the reference point that is within a range defined by a snapping tolerance and the current distance; and
a rendering module to display a snapping location on a closest one of the subset as measured from the current cursor location on the display, the snapping location being displayed separately from a display of the current cursor location.

16. The system of claim 15, comprising:
a user input device to provide the current cursor location to the snapping module.

17. The system of claim 15, comprising:
a server including the snapping module.

18. A non-transitory computer-readable medium having instructions stored therein for causing a computer to implement a method, comprising:
determining a substantially perpendicular current distance from a guide line that passes through a given current cursor location, to a reference point;
determining candidate guide lines that comprise a subset of a larger group of guide lines and that are associated with at least one drawing object, each one of the subset having a substantially perpendicular reference distance to the reference point that is within a range defined by a snapping tolerance and the current distance; and
displaying a snapping location on a closest one of the subset as measured from the current cursor location including displaying the snapping location separately from a display of the current cursor location.

19. The non-transitory computer-readable medium of claim 18, wherein displaying the snapping location comprises:
displaying a line segment on the closest one of the subset defined by the current cursor location and the snapping location.

20. The non-transitory computer-readable medium of claim 18, wherein the method comprises:
storing the reference distance in an array sorted according to the reference distance.

* * * * *